T. Mabbett. Jr. Berry Box.

73352

PATENTED
JAN 14 1868

Witnesses
Theo Tusche
W. Trewrn

Inventor
T. Mabbett Jr
Per Munn & Co
Attorneys

United States Patent Office.

TRUMAN MABBETT, JR., OF VINELAND, NEW JERSEY.

Letters Patent No. 73,352, dated January 14, 1868.

IMPROVEMENT IN BERRY-BOXES.

*The Schedule referred to in these Letters Patent and making part of the same.*

TO ALL WHOM IT MAY CONCERN:

Be it known that I, TRUMAN MABBETT, Jr., of Vineland, in the county of Cumberland, and State of New Jersey, have invented a new and improved Berry-Box, and that the following-description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention is designed to supersede the small baskets and boxes now used for conveying berries and small fruit to market.

The invention consists in a novel construction of the box, as hereinafter fully shown and described, whereby the berries are effectually prevented from being bruised or injured in their transit from place to place, a free circulation of air allowed them when a series of boxes is packed within a case, and the boxes rendered capable of being manufactured at a very moderate cost. In the accompanying sheet of drawings—

Figure 1:
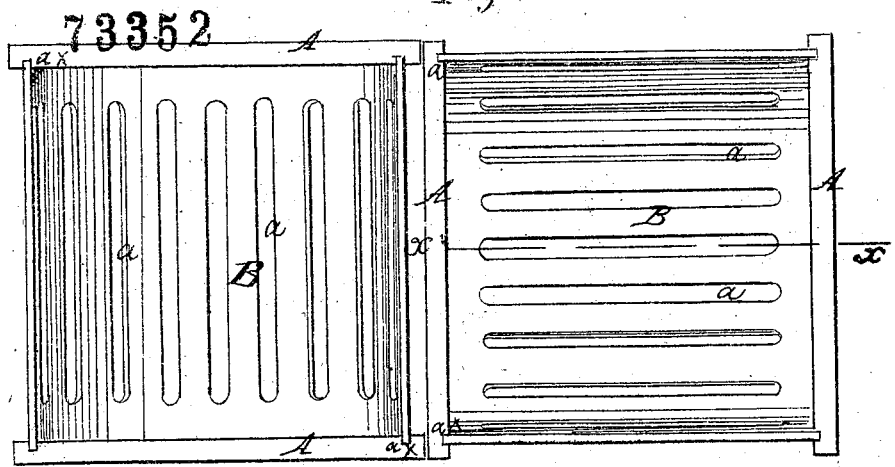

Figure 1 is a plan or top view of my invention.

Figure 2:
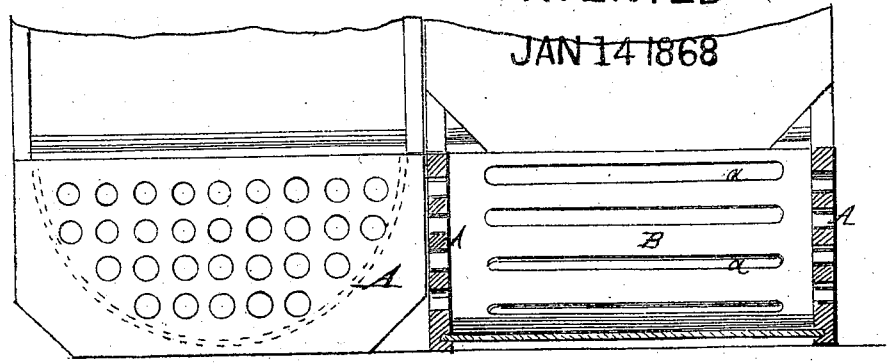

Figure 2, a vertical section of fig. 1, taken in the line $x\ x$.

Figure 3:
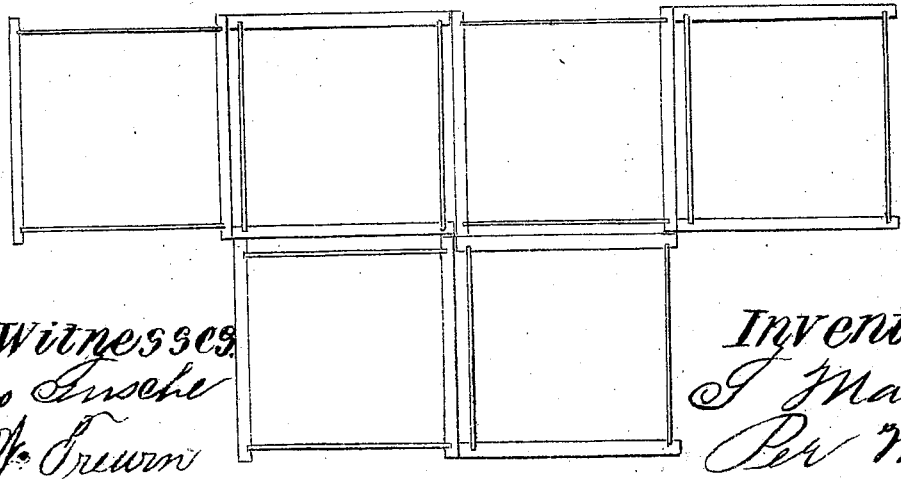

Figure 3, a diagram designed to show the manner in which the boxes are packed in a case.

Similar letters of reference indicate like parts.

My improved boxes are constructed of two end pieces A A, parallel with each other, and having an upright position, with horizontal and parallel top and bottom edges, the angles or corners of the bottoms of the end pieces being taken off or removed, as shown in fig. 2. The body B of the box is constructed of a thin strip of wood, bent so as to form a semicircle in its transverse section. The ends of the body B are fitted in semicircular grooves, $a^\times$, made in the inner surfaces of the end pieces A A, and are secured in said grooves by glue or otherwise. The body B is perforated with holes or oblong slots, $a$, as also are the end pieces A A. These holes or slots afford a free circulation of air through the berries and boxes. The edges or ends of the body B are flush with the upper surfaces of the end pieces A A, but the lower edges of the end pieces extend below the lower parts of the body B, and serve as a base for the box.

The boxes are about square, and, when packed in a case, are adjusted or placed so that the body of one box will be at right angles to the one adjoining it at the sides, as well as to the one placed on top. As the boxes are constructed of wood, I design to have them coated with shellac-varnish, in order to prevent the flavor of the fruit from becoming injured by being in contact with the wood.

Having thus described my invention, I claim as new, and desire to secure by Letters Patent—

A box for berries and other small fruit, constructed of two upright end pieces, A A, and a body, B, of semicircular form in its transverse section, and secured to the end pieces, as shown, the body and end pieces being perforated or not, as desired, substantially as herein shown and described.

TRUMAN MABBETT, Jr.

Witnesses:
TRUMAN MABBETT, Sr.,
CHARITY L. MABBETT.